United States Patent
Gu et al.

(10) Patent No.: US 6,663,524 B2
(45) Date of Patent: Dec. 16, 2003

(54) HYBRID POWER SYSTEM

(75) Inventors: Huan-Lung Gu, Hualian (TW); Chin-Taz Wu, Taipei Hsien (TW); Pan-Hsiang Hsieh, Hsinchu Hsien (TW); Wen-Bin Lee, Hsinchu Hsien (TW); Chun-Hsien Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 32 days.

(21) Appl. No.: 10/038,137

(22) Filed: Dec. 31, 2001

(65) Prior Publication Data

US 2003/0092525 A1 May 15, 2003

(30) Foreign Application Priority Data

Nov. 14, 2001 (TW) ..................................... 90219562 U

(51) Int. Cl.[7] ................................................. F16H 3/72
(52) U.S. Cl. ............................ 475/5; 180/65.2; 474/15
(58) Field of Search ............................... 475/5, 9, 200, 475/209, 210; 180/65.2; 474/15

(56) References Cited

U.S. PATENT DOCUMENTS

| | | | | |
|---|---|---|---|---|
| 3,975,964 A | * | 8/1976 | Adams | 474/15 |
| 5,086,671 A | * | 2/1992 | Oshidari | 477/41 |
| 5,145,464 A | * | 9/1992 | Mori | 474/16 |
| 5,193,634 A | * | 3/1993 | Masut | 180/65.2 |
| 6,007,443 A | * | 12/1999 | Onimaru et al. | 475/5 |
| 6,109,127 A | * | 8/2000 | Liau | 74/336 B |
| 6,155,369 A | * | 12/2000 | Whittaker | 180/220 |
| 6,280,357 B1 | * | 8/2001 | Van Spijk | 474/16 |
| 6,302,227 B1 | * | 10/2001 | Takemura et al. | 180/65.2 |
| 6,344,008 B1 | * | 2/2002 | Nagano et al. | 475/1 |
| 6,346,062 B1 | * | 2/2002 | Shimabukuro et al. | 477/5 |
| 6,359,404 B1 | * | 3/2002 | Sugiyama et al. | 318/432 |
| 6,414,401 B1 | * | 7/2002 | Kuroda et al. | 290/40 C |
| 6,427,793 B1 | * | 8/2002 | Hanada et al. | 180/65.2 |

* cited by examiner

Primary Examiner—Rodney H. Bonck
Assistant Examiner—David D. Le
(74) Attorney, Agent, or Firm—Pro-Techtor International Services

(57) ABSTRACT

A hybrid power system, comprising a first power unit, a secondary shaft, a speed converter, a clutch, and an electric motor. The first power unit has a primary shaft. The secondary shaft is driven by the primary shaft in a rotational movement. The speed converter is placed between the primary shaft and the secondary shaft, having a transmission belt, transmitting torque from the primary shaft to the secondary shaft. The clutch is set on the primary shaft or on the secondary shaft, allowing or interrupting transmission of torque from the first power unit to the secondary shaft. The electric motor is connected with the secondary shaft, either driving the secondary shaft or being driven by the secondary shaft to generate electricity or running idle.

11 Claims, 4 Drawing Sheets

HYBRID POWER SYSTEM

BACKGROUND OF THE INVENTION

1. Field of the Invention

The present invention relates to a hybrid power system, particularly to a hybrid power system to be used in conjunction with a small internal combustion engine and an electric motor.

2. Description of Related Art

Conventionally, a vehicle is driven by an internal combustion engine. An internal combustion engine generates power that is transmitted to wheels to drive the vehicle. Since internal combustion engines operate by burning fuel, exhaust gas is produced, polluting air. For protecting the environment, electrically driven vehicles have been developed, having no internal combustion engines, but being driven by electric motors powered by batteries. In an electrically driven vehicle, electric energy stored in a battery is converted to mechanical energy by a motor. Mechanical power is by a gear transmitted to wheels. However, batteries have limited energy storage capabilities, so mileage of electrically driven vehicles is insufficient and generally do not meet motorists' demands. Electrically driven vehicles have therefore been sold only in small quantities and are not widely used. For this reason, vehicles driven by hybrid power systems have been developed, each having an engine and an electric motor. By suitable arranging of a transmission device, varying output of power is generated, with torque of the engine and the electric motor adapted appropriately to each other. Thus effective operation is achieved under various conditions, such as climbing, descending, braking and accelerating. An ideal combination of both motors results in efficient operation with high power output and low exhaust gas generation.

Due to a wide variety of transmission devices, hybrid power systems with varying components and varying effects exist. Currently, hybrid power systems are mostly used in four-wheel cars, with hundreds of systems having been developed and large competition between major car manufacturers.

However, small vehicles which are driven by small engines, like light motorcycles and minicars, have little space and need to be inexpensive. So it is difficult to install transmission devices for hybrid power systems of small vehicles. Consequently, very few hybrid power systems are used in small vehicles. Although some research is being done and several related inventions have been made, there is only a narrow range of applications of hybrid power systems of small vehicles.

In conventional art, several patents concerning hybrid power systems have been disclosed. Therein, an epicyclic train is taught, where a sun gear and planet gear is driven by an engine and an electric motor. Power output is at a ring gear. Since no torque converter is installed between the engine and the epicyclic train, any change of speed leads to jerks, with the engine and the electric motor not being adapted to each other. When the engine slows down, there is no way to interrupt power transmission. Thus this power transmission device is impractical.

Therefore, a hybrid power system for small vehicles is not only required to be accommodated in a small space, but also to allow for independent operation of the engine and the electric motor, as well as for smooth adaptation thereof to each other. Furthermore, it is desirable to regenerate electric energy by operating the engine and taking advantage of momentum of the moving vehicle. Then a comprehensive effect of the hybrid power system is achieved. At the same time, a direction of development of small power devices, as for motorcycles and minicars, is marked.

SUMMARY OF THE INVENTION

It is the object of the present invention to provide a hybrid power system which is inexpensive.

In the present invention, an engine and an electric motor are connected by a speed converter having a V-shaped belt for smooth mutual connection and controlled by controlling devices, so that the following functions are effectively performed:

1. the engine running slowly or stopped, with the electric motor running idle;
2. the engine running slowly or stopped, with the electric motor driving the vehicle forward;
3. the engine running slowly or stopped, with the electric motor driving the vehicle rearward;
4. the engine running, via the speed converter with V-shaped belt driving the vehicle, with the electric motor running idle;
5. theengine running, via the speed converter with V-shaped belt driving the vehicle, with the electric motor generating electricity;
6. the engine running, via the speed converter driving the vehicle, with the electric motor in addition driving the vehicle;
7. the engine slowing down or stopping, with the electric motor generating electricity due to momentum of the vehicle slowing down;
8. the engine running, with the electric motor running idle and an electric generator attached to the engine generating electricity, while the vehicle rests.

By employing a standard engine and a standard electric motor, the present invention provides an inexpensive hybrid power system, allowing for flexible adapting to various power standards and a wide range of operating conditions. The present invention is usable in conjunction with two-wheel as well as four-wheel vehicles, ensuring a wide range of applications.

The present invention can be more fully understood by reference to the following description and accompanying drawings.

DETAILED DESCRIPTION OF THE PREFERRED EMBODIMENTS

Figure 1:
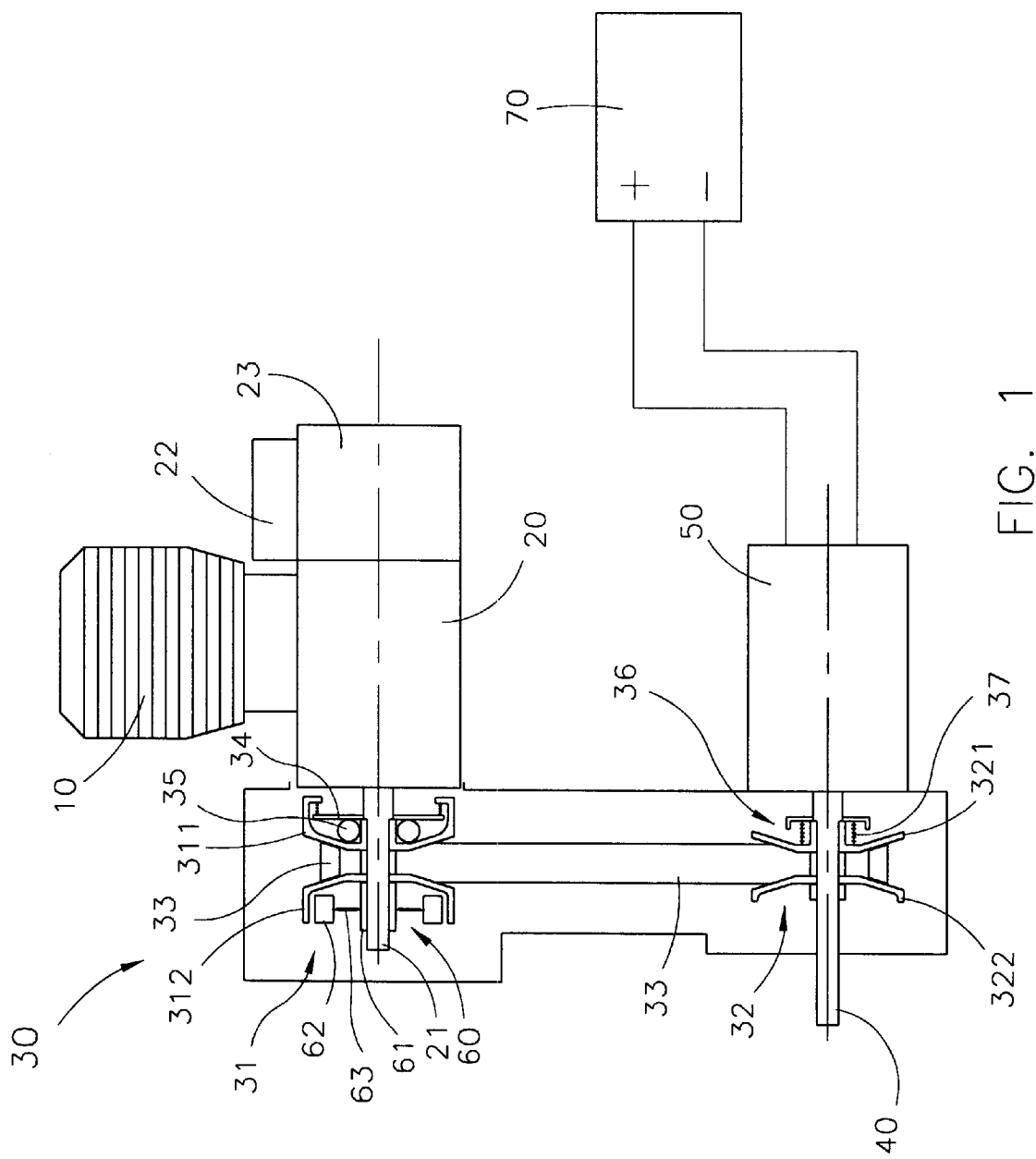
FIG. 1 is a schematic illustration of the hybrid power system of the present invention in the first embodiment.

As shown in FIG. 1, the hybrid power system of the present invention in a first embodiment mainly comprises: a first power unit 10; a transmission box 20; a speed converter 30 with a V-shaped belt; a secondary shaft 40; and an electric motor 50. The first power unit 10 via the transmission box 20 drives a primary shaft 21. The primary shaft 21 drives the speed converter 30, which in turn drives a rotational movement of the secondary shaft 40. A transmission system finally drives a vehicle.

Any power-generating device is employable as the first power unit 10, being depicted in the Figs. as an internal combustion engine. The transmission box 20 is a crankshaft system. A starter 22 and an electric generator 23 are attached to the transmission box 20. The starter 22 is operated manually or electrically for starting the first power unit 10. The electric generator 23 is driven by the first power unit 10, generating a small quantity of electricity for recharging and providing timing signals of the rotating movement of the first power unit 10.

The speed converter 30 with a V-shaped belt comprises: a primary wheel 31, put on the primary shaft 21; a secondary wheel 32, put on the secondary shaft 40; and a V-shaped transmission belt 33 between the primary and secondary wheels 31, 32 for having the primary wheel 31 drive the secondary wheel 32. The primary wheel 31 is composed of two cone-shaped wheel plates 311, 312, with a gap left in between. The wheel plate 311 is glidingly movable on the primary shaft 21 in an axial direction. A blocking plate 34 is set on the primary shaft 21, facing an outer side of the wheel plate 311. Several grooves on the outer side of the wheel plate 311 accommodate several balls 35, which are located between the outer side of the wheel plate 311 and the blocking plate 34. When the primary wheel 31 rotates, the balls 35 are by a centrifugal force radially driven away from the primary shaft 21. Then the balls 35 are blocked by the blocking plate 34 while still being exposed to the centrifugal force. A resulting counterforce pushes the wheel plate 311 axially, changing the width of the gap between the wheel plates 311, 312.

The secondary wheel 32 is composed of two cone-shaped wheel plates 321, 322, with a gap left in between. The wheel plate 321 is glidingly movable on the secondary shaft 40 in an axial direction. A torque cam 36 and a spring 37 are inserted between the wheel plate 321 and the secondary shaft 40. Thus the wheel plate 321, when exposed to a changed torque, axially moves along the secondary shaft 40, changing the width of the gap between the wheel plates 321, 322.

The balls 35 and the torque cam 36 cause the wheel plates 311, 312 of the primary wheel 31 and the wheel plates 321, 322 of the secondary wheel 32 to move together or apart according to the rotational speed of the first power unit 10 and torque load. The V-shaped transmission belt 33 has a cross-section with an inclined surface that corresponds to inclinations of the wheel plates 311, 312 and 321, 322. Changing the widths of the gaps between the wheel plates 311, 312 and 321, 322 changes diameters of circumference of the V-shaped transmission belt 33 on the primary and secondary wheels 31, 32, respectively. Thus rotational speed is geared down in the speed converter by continuous ratios, adapting the rotational speed of the first power unit 10 to torque load.

Furthermore, the speed converter 30 has a clutch 60. The clutch 60 is either set on the primary shaft 21 or on the secondary shaft 40. In the embodiments shown in the Figs., the clutch 60 is inserted between the primary shaft 21 and the wheel plate 312. An outer side of the wheel plate 312 is covered with a frictional coating. The clutch 60 comprises a seat 61, several gripping blocks 62 and several springs 63 between the seat 61 and the gripping blocks 62. The seat 61 is fixed on the primary shaft 21. The several gripping blocks 62 are placed inside the frictional coating of the wheel plate 312 and are connected with the seat 61, with the springs 63 pulling the gripping blocks 62 towards the seat 61. When the first power unit 10 has reached a certain rotational speed, the gripping blocks 62 are pushed radially outward by a centrifugal force, pressing on the frictional coating, so that torque from the primary shaft 21 is transmitted to the primary wheel 31. The clutch 60 ensures that at a rotational velocity of the first power unit 10 below a clutching threshold no torque is transmitted from the primary shaft 21 to the primary wheel 31. Only when the primary shaft 21 rotates faster, causing the gripping blocks 62 to engage with the frictional coating, the primary wheel 31 is taken along by torque from the primary shaft 21.

The main characteristic of the present invention lies in the electric motor 50 being additionally set on the secondary shaft 40. The electric motor 50 is connected to a rechargeable battery 70, supplying the electric motor 50 with power for turning the secondary shaft 40. Conversely, the electric motor 50, when turned by the secondary shaft 40, generates an electric current which recharges the battery 70. The secondary shaft 40 is turned by the first power unit 10 or by the electric motor 50 or by both the first power unit 10 and the electric motor 50. Thus composite power by two different sources, the first power unit 10 and the electric motor 50, drives the vehicle.

Figure 2:
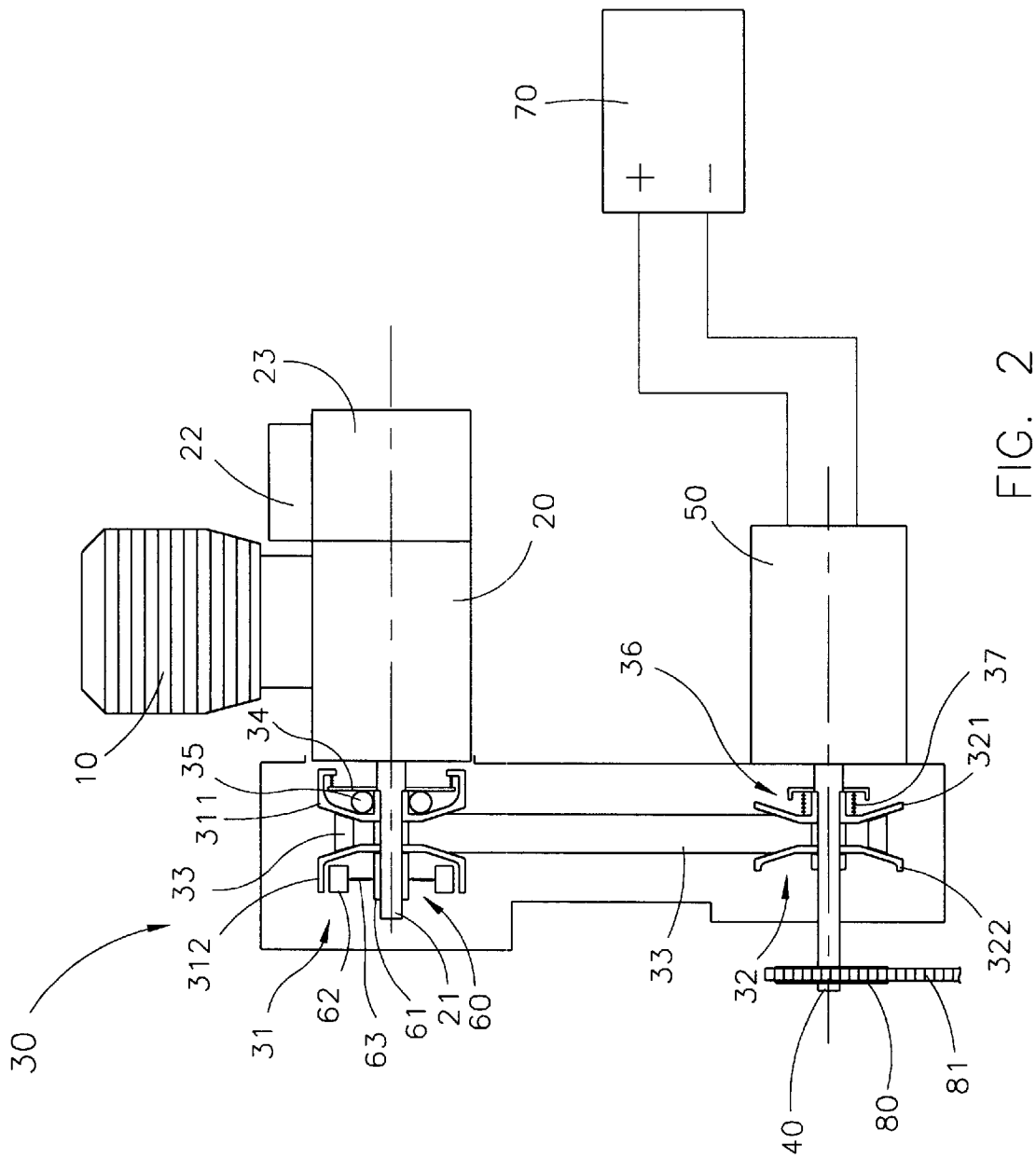
FIG. 2 is a schematic illustration of the hybrid power system of the present invention in the second embodiment, to be used in conjunction with a two-wheel vehicle.
Figure 3:
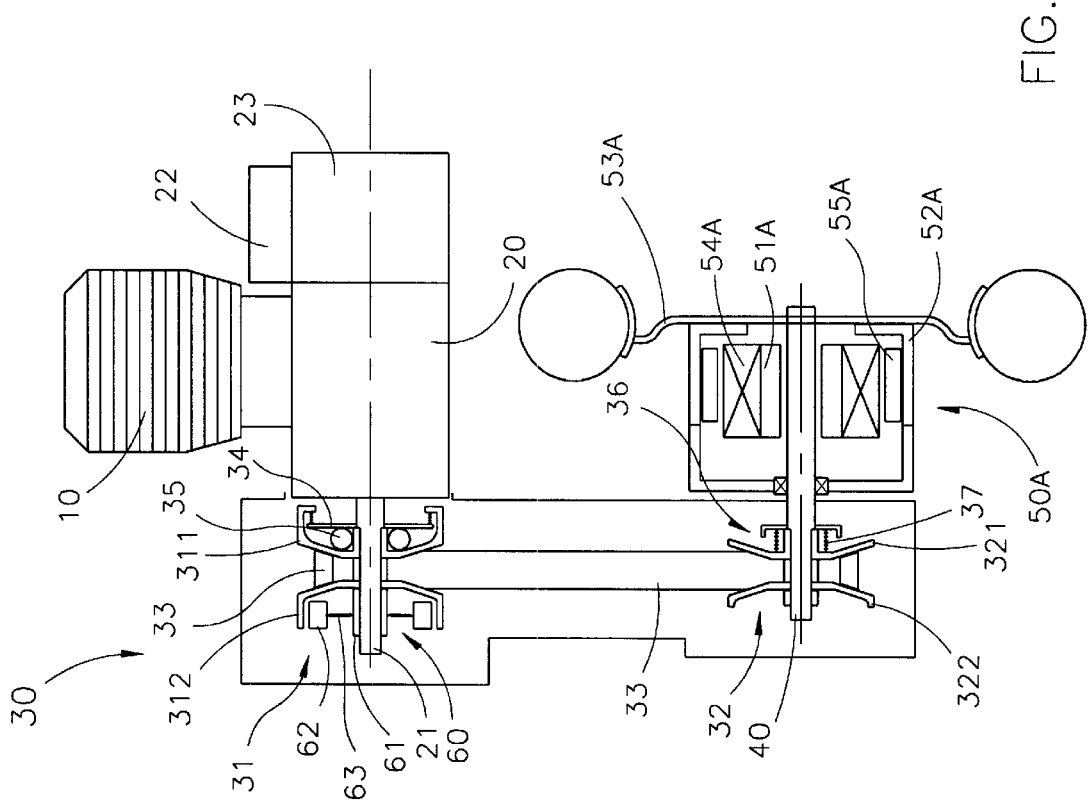
FIG. 3 is a schematic illustration of the hybrid power system of the present invention in the third embodiment, to be used in conjunction with a two-wheel vehicle.

Referring to FIG. 2, in a second embodiment of the present invention, used in conjunction with a two-wheel vehicle, a sprocket 80 is put on a far end of the secondary shaft 40, with a chain 81 running over the sprocket 80 for driving the vehicle. Referring to FIG. 3, in a third embodiment of the present invention, again used in conjunction with a two-wheel vehicle, a structure is used that is basically the same as in the first embodiment. In contrast to the first embodiment, an electric motor assembly 50A having an external rotor is used. The electric motor assembly 50A comprises: a stator 51A; a rotor 52A; and a wheel hub 53A, attached to the far end of the secondary shaft 40 and driven thereby. The rotor 52A is shaped like a circular drum, fastened to the secondary shaft 40 or to the wheel hub 53A, thus being driven by the secondary shaft 40 or the wheel hub 53A. The stator 51A is inserted in a space between the secondary shaft 40 and the rotor 52A, having a fixed position and not being connected with the secondary shaft 40. Several coils 54A are mounted in the stator 51A. Several magnets 55A, fixed on the rotor 52A, surround the coils 54A. An electric current through the coils 54A generates a magnetic field interacting with the magnets 55A, driving the rotor 52A in a rotating movement, taking along the secondary shaft 40 and the wheel hub 53A. Employing the electric motor assembly 50A of the third embodiment with an external rotor is especially suitable for use on a light motorcycle.

Figure 4:
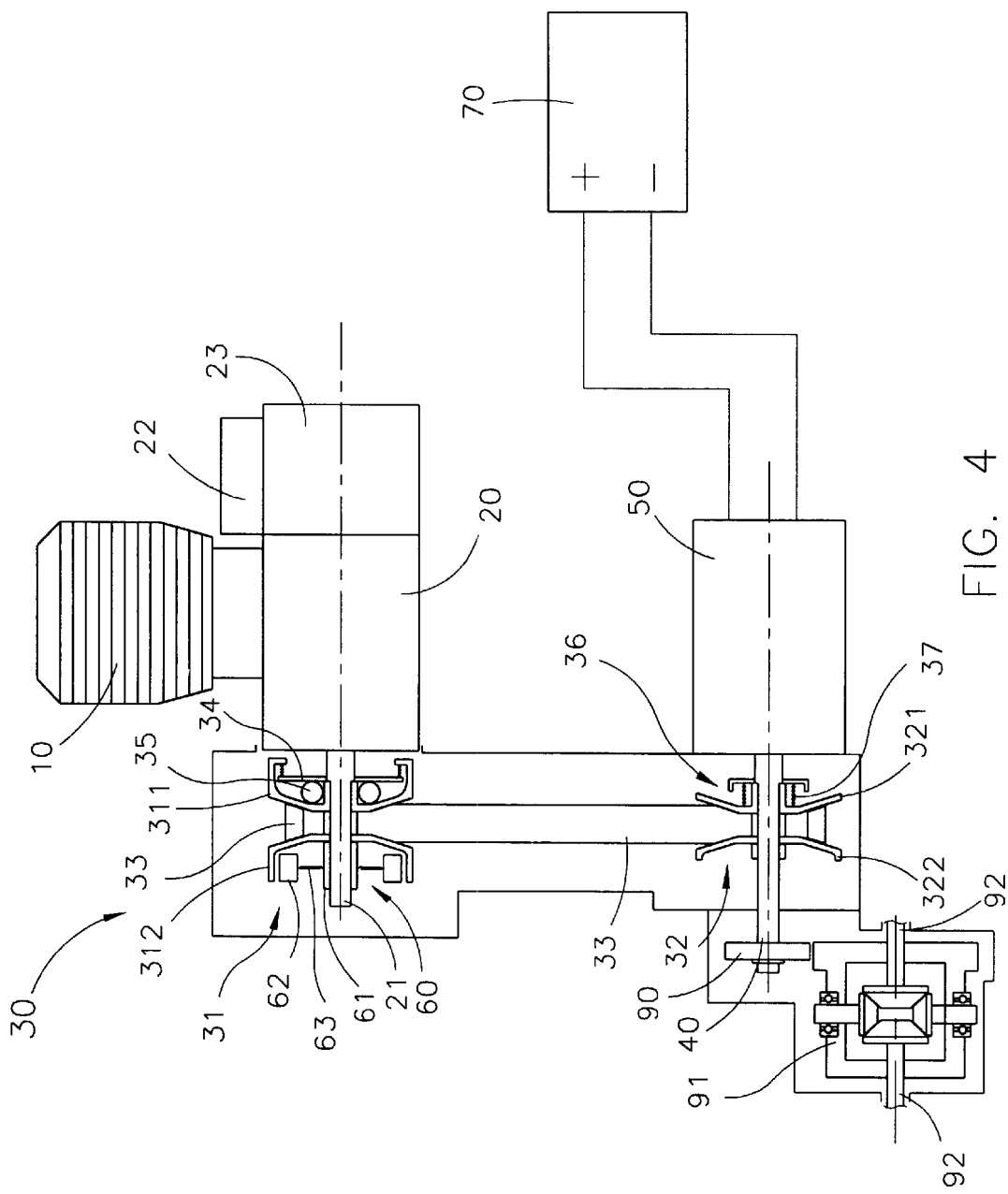
FIG. 4 is a schematic illustration of the hybrid power system of the present invention in the fourth embodiment, to be used in conjunction with a four-wheel vehicle.

Referring now to FIG. 4, in a fourth embodiment of the present invention, used in conjunction with a four-wheel vehicle, a gear wheel 90 for reducing rotational speed is connected with the secondary shaft 40. The gear wheel 90 drives a differential gear 91 with two driven shafts 92, which are connected to left and right wheels of the vehicle.

The arrangement described above has the following advantages: The speed converter 30 with V-shaped transmission belt, having ideal torque-converting capability, smoothly takes up any given torque load and adapts speed accordingly, without sudden speed changes. The present invention takes advantage of this feature, with the primary wheel 31 rotating along with the primary shaft 21 of the first power unit 10 and the secondary wheel 32 rotating along with the secondary shaft 40 of the electric motor 50, forming a combined power source. The speed converter 30 connects and smoothly adapts the first power unit 10 and the electric motor 50 to each other. By employing standard control devices and sensors, like a vehicle speed detector, a rotational speed detector and an accelerator sensor, the power sources are separately controlled for effective combining thereof. The underlying logic and principle are explained below.

A. Parking of Vehicle:

When the vehicle is parked, but the engine runs slowly, the clutch 60, due to restriction to rotational speeds above the clutching threshold, does not transmit torque from the first power unit 10 to the secondary shaft 40. The first power unit 10 keeps rotating at a certain speed, without the vehicle being moved. The clutching threshold of rotational speed is variable by exchanging the gripping blocks 62 for adapting to various types of vehicles. Furthermore, the electric motor 50 is by a control circuit kept idle and prevented from operating to keep the vehicle at rest.

B. Starting of Vehicle:

When starting, the vehicle moves slowly. If the engine moves the vehicle, driving thereof is performed inefficiently. The electric motor 50, however, is able to generate high torque at low speed. Therefore, the present invention by a control device keeps the engine stopped, instead causing the electric motor 50 to operate to drive the secondary shaft 40 and a gearbox for moving the vehicle. Then only the electric motor 50 generates torque, slowly accelerating the vehicle.

C. Reverse Driving:

For vehicles with at least three wheels, the ability of reverse driving is usually demanded. During reverse driving, speed is slow. Therefore in this state the engine stops or rotates slowly, while the electric motor 50 operates in reverse direction, driving the vehicle. Thus no reverse gear needs to be provided.

D. Cruising at Medium Speed:

When the electric motor 50 drives the vehicle to move at medium speed and additional power is needed to accelerate the vehicle, while the first power unit 10 is turned off, a control device causes the starter 22 to start the first power unit 10. The first power unit 10 is accelerated to a speed above the clutching threshold, so that the clutch 60 engages and torque is transmitted via the speed converter 30 to the secondary shaft 40, being adapted to the electric motor 50. After that, the electric motor 50 keeps operating or is switched to run idle, consuming no electric energy, while the engine operates under efficient conditions.

E. Generating Electricity While Moving at Medium to High Speed:

If stored electricity runs low, while the first power unit 10 is driving the vehicle, the electric motor 50 is switched to a generator function. The first power unit 10 is accelerated, and the electric motor 50 generates electricity, recharging the battery 70 controlled by a control device. Due to the torque-changing characteristics of the speed converter 30, the additional load of the electricity generating electric motor 50 will not lead to a sudden change of speed. At the same time, the control device regulates the load of the electric motor 50 according to the state of the engine, and no change of behavior of the vehicle will be felt.

F. Fast Accelerating:

When an accelerator throttle valve is opened fast to accelerate the vehicle or to provide additional power, while the vehicle cruises driven by the first power unit 10, the electric motor 50 is switched on. Since the electric motor 50 is continuously harmonized with output of the first power unit 10, no sudden forces affect driving of the vehicle.

G. Braking and Recharging the Battery:

When the vehicle brakes or moves downhill, the electric motor 50 is instantly switched to generate electricity. A magnetic field with inertia in the electric motor 50 increases mechanical load, which is overcome by mechanical inertia of the slowing vehicle. In this state, the battery 70 is recharged. If the battery 70 is already fully charged, braking of the vehicle is performed mechanically.

H. Cruising at Low Speed:

When the speed of the vehicle is less than a preset value, without the accelerator throttle valve being further opened, so that load is small, a control device switches on the electric motor 50 to drive the vehicle and turns off the engine, preventing the engine from running at a speed below the clutching threshold.

I. Stopping the Vehicle:

When the vehicle is stopped, e.g. at a traffic light, or is kept at rest for a time, the engine is stopped to minimize gas consumption as well as production of exhaust gas. At the same time, the electric motor 50 is prepared to drive the vehicle as soon as the vehicle is supposed to depart.

J. Cruising at Low Speed While Generating Electricity:

While the vehicle moves at slow speed, the engine is stopped and the vehicle is driven by the electric motor 50. If in this state stored electricity has run low, remaining charge is displayed and, initialized automatically or manually, the starter 22 starts the engine. Rotational speed thereof is increased sufficiently to match the rotational speed of the secondary shaft 40. At the same time, the electric motor 50 is switched to generating electricity. Then the engine not only maintains speed, but also moves the electric motor 50 to generate electricity. After the battery 70 has been charged up to a preset quantity, the engine is turned off and the electric motor 50 is switched back to drive the vehicle to minimize air pollution.

K. Generating Electricity while Parking:

If stored electricity runs low, while the vehicle is completely at rest, remaining charge is displayed and, initialized manually, the starter 22 starts the engine. Then the engine runs idly at a comparatively high rotational speed, with the clutch 60 not being engaged. The electric motor 50 is in an idle state. The engine drives the electric generator 23, which in turn generates electricity at a comparatively small rate for emergency-charging the battery 70. If necessary, a control device turns off the engine if produced exhaust gas, as sensed by a sensor, exceeds a preset quantity. Moreover, an external circuit is usable to charge the battery 70.

L. Starting without Battery:

If the battery 70 is completely discharged, while the vehicle is at rest and the engine is stopped, the engine is started manually, e.g. by using a kick starter. A control device then speeds up the idle rotational speed of the engine, so that the electric generator 23 generates electricity for recharging the battery 70. If at this time the accelerator throttle valve is opened, the engine speeds up, driving forward the vehicle and the electric motor 50, so that electricity is generated at a comparatively large rate, recharging the battery 70. After the battery has been recharged, the states D or F are switched to.

By operating in various modes, as described above, the present invention adapts to every state of a vehicle, respectively selecting the most suitable mode, so that energy consumption and air pollution are minimized and cruising as well as accelerating are readily controlled. When the vehicle is slowed down or stopped, no noise and no exhaust gas are produced. Furthermore, the present invention has a simple structure, employing standard components, and saves structural parts by not requiring a reverse gear for four-wheel vehicles. Thus costs are greatly reduced, while abilities are extended. The range of applications is large due to applicability to two-wheel as well as four-wheel vehicles, resulting in technical superiority of the present invention among hybrid power systems.

While the invention has been described with reference to preferred embodiments thereof, it is to be understood that modifications or variations may be easily made without departing from the spirit of this invention which is defined by the appended claims.

What is claimed is:

1. A hybrid power system with continuously variable speed, comprising:

a first power unit having a primary shaft;

a secondary shaft driven to rotate by said primary shaft;

a speed converter placed between said primary shaft and said secondary shaft, said speed converter has a transmission belt that transmits torque from said primary shaft to said secondary shaft;

a clutch set on said primary shaft that controls transmission of torque from said first power unit to said secondary shaft by means of a plurality of gripping blocks that contact a frictional coating on a primary wheel of said primary shaft;

an electric motor connected to said second secondary shaft, said electric motor either drives said secondary shaft or is driven by said secondary shaft to generate electricity or is in an idle state.

2. A hybrid power system according to claim 1, wherein said secondary shaft has an end to which a gear wheel is attached, said gear wheel driving a differential gear with two driven shafts which are connected to wheels of a vehicle.

3. A hybrid power system according to claim 1, wherein said first power unit is an internal combustion engine to which a starter for starting said first power unit and an electric generator are attached, said electric generator is driven by said first power unit to generate electricity and timing signals of a rotating movement of said first power unit.

4. A hybrid power system according to claim 1, wherein said clutch further comprises a seat, at least one of said gripping blocks, and at least one spring.

5. A hybrid power system according to claim 1, wherein said electric motor is connected with a rechargeable battery as an energy source to drive said secondary shaft.

6. A hybrid power system according to claim 1, wherein said secondary shaft is either driven by said speed converter alone or by said electric motor alone or by said speed converter and said electric motor combined.

7. A hybrid power system according to claim 1, wherein said electric motor, when not operating as a motor, generates electricity to recharge a battery.

8. A hybrid power system according to claim 1, wherein said transmission belt has a V-shaped cross-section.

9. A hybrid power system according to claim 1, wherein said secondary shaft has an end to which a sprocket is attached, with a chain running over said sprocket to transmit torque from said secondary shaft.

10. A hybrid power system according to claim 1, wherein said speed converter further comprises:

said primary wheel having two wheel plates of conical shapes;

a ball placed outside a rotational axis, said ball controls a distance between said two wheel plates of said primary wheel;

a secondary wheel having two wheel plates of conical shapes; and a torque cam with a spring that controls a distance between said two wheel plates of said secondary wheel depending on load;

wherein said transmission belt runs over said primary and secondary wheels.

11. A hybrid power system according to claim 10, wherein said transmission belt has a V-shaped cross-section.

* * * * *